Patented Dec. 28, 1943

2,337,680

UNITED STATES PATENT OFFICE 2,337,680

RUBBER COMPOSITION

Warren E. Phillips, Cuyahoga Falls, Ohio, assignor to The B. F. Goodrich Company, New York, N. Y., a corporation of New York No Drawing. Application July 3, 1939, Serial No. 282,739

6 Claims. (Cl. 260—763)

This invention relates to rubber compositions having low hysteresis, and to a method for obtaining the same.

It has long been known that desirable properties are imparted to rubber compositions by including therein heavy loadings of certain pigments. Thus channel black is incorporated in tire tread compositions in proportions as high as fifty or more parts by weight per hundred parts of rubber to obtain good abrasion resistance. Similar heavy loadings of zinc oxide in tire carcass compositions produce great resistance to tear at high temperatures, as well as resistance to separation of rubber from fabric and blow-out at high temperatures and heavy loads. High pigment loadings also increase adhesion of rubber to the tire cord, and improve the impregnation of the cord by the rubber composition.

The incorporation of large amounts of pigments in rubber, however, is ordinarily accompanied by the development of undesirable properties, thereby limiting the extent to which heavy loadings can be employed to promote desirable properties. This is particularly true of heavy loadings with materials which are available as pigments having an ultimate average particle size with respect to volume of not over 1 micron such as channel black, zinc oxide, titanium dioxide, calcium silicate, and calcium carbonate and which usually produce rubber compositions having greatly increased hysteresis and high permanent set.

It is the principal object of this invention to provide rubber compositions which may be heavily loaded and still possess low permanent set and low hysteresis. Other objects will appear from the following description.

I have discovered that the objects of this invention may be accomplished by employing in the vulcanization of heavily loaded rubber compositions a mercapto aliphatic thiazole or a derivative thereof in which the hydrogen of the mercapto group is replaced by a radical which does not destroy the ability of the compound to accelerate vulcanization. Mercapto aliphatic thiazoles are members of a class of compounds containing the structure

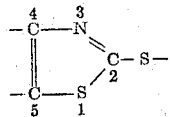

wherein the adjoining carbon atoms do not constitute part of another ring structure. Typical accelerators which may be employed in the practice of this invention accordingly include free mercapto thiazoles such as 2-mercapto-4,5-dimethylthiazole, 2-mercapto-4-ethylthiazole, 2-mercapto-4-methyl-5-ethylthiazole, as well as their sodium and zinc salts and the corresponding disulfides. Accelerators such as 2-mercapto-4-phenyl-thiazole containing an aryl group on one or both adjoining carbon atoms are considered to be mercapto aliphatic thiazoles since they possess the unique properties of this class of compounds, and carbon atoms 4 and 5 are not included in another ring structure. The two preferred classes of mercapto aliphatic thiazyl accelerators are the 2-mercapto alkyl thiazoles having the general formula

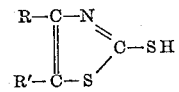

wherein R represents a member of the class consisting of hydrogen and alkyl groups and R' represents an alkyl group, and the dialkylthiazyl mono- and polysulfides containing the structure

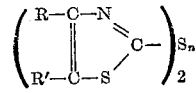

wherein R and R' are as above and $n$ represents an integer from 1 to 4, inclusive.

As an example of an embodiment of the method of this invention, di-4,5-dimethylthiazyl disulfide was used as an accelerator in place of methylene para-toluidine in the following compositions.

| | | |
|---|---|---|
| Rubber | 100 | 100 |
| Zinc oxide | 10 | 10 |
| Gas black | 51 | 51 |
| Sulfur | 5.5 | 5.5 |
| Antioxidant | 0.75 | 0.75 |
| Methylene para-toluidine | .30 | 0 |
| Di-4,5-dimethylthiazyl disulfide | 0 | .30 |

Solid tires intended for high speed operation were made with these compositions and tested on a Bureau of Standards dynamometer at a speed of 45 miles per hr. under an initial load of 1500 lbs. which was increased by 250 lbs. every 30 min. The tire containing methylene paratoluidine blew out in 60 min. in this test, while the tire containing the mercapto alkyl thiazyl accelerator ran for 88 min.

I have found that the mercapto aliphatic thiazyl accelerators of this invention effect a great improvement in properties when used instead of even such closely related accelerators as the mercapto arylene thiazoles. The following heavily-loaded carcass compositions were prepared:

|  | A | B |
|---|---|---|
| Rubber | 100 | 100 |
| Zinc oxide | 42.50 | 42.50 |
| Fatty acid | .85 | .85 |
| Softener | .35 | .35 |
| Channel black | .25 | .25 |
| Antioxidant | .80 | .80 |
| Sulfur | 2.75 | 2.75 |
| 2-mercaptobenzothiazole | .40 | 0 |
| Mercaptoalkylthiazoles [1] | 0 | .40 |

[1] A mixture of about 80 parts of 2-mercapto-4,5-dimethylthiazole and 20 parts of 2-mercapto-4-ethylthiazole.

The stocks were then vulcanized and tested for hysteresis and permanent set by the method described by Lessig, Ind. & Eng. Chem. Analyt. Ed. 1937, 582. The results are tabulated below:

| Accelerator | $\Delta T$ (°F.) [1] room temp. | Permanent set (%) 212° F. |
|---|---|---|
| 2-mercaptobenzothiazole | 40 | 4.4 |
| Mercaptoalkylthiazoles | 24 | 2.9 |

[1] Represents the temperature rise during flexing.

The great difference in hysteresis and permanent set obtained by substituting an alkyl thiazole accelerator for an arylene thiazole accelerator permits the compounder to take much greater advantage of the desirable properties imparted to rubber by heavy loadings than has hitherto been possible.

It will be noted that fatty acid was included in the above composition. Fatty acid is essential in heavily-loaded compositions containing ordinary acidic accelerators to effect a proper cure. This is undesirable from the processing standpoint, since the fatty acid blooms to the surface during the storage of the unprocessed article and causes the surface to become dry, causing difficulty in building. It is an advantage of the aliphatic thiazyl accelerators that heavily-loaded stocks accelerated therewith do not require fatty acid. Fatty acid is included in the specific examples, however, so that the stocks being compared will be identical except for the accelerator.

In another embodiment of the method of this invention, the following heavily-loaded tire tread stocks were prepared:

|  | A | B |
|---|---|---|
| Rubber | 100 | 100 |
| Channel black | 42.2 | 42.2 |
| Gas black | 10.55 | 10.55 |
| Zinc oxide | 3.25 | 3.25 |
| Softener | 2.80 | 2.80 |
| Fatty acid | .75 | .75 |
| Sulfur | 2.95 | 2.95 |
| Antioxidant | .75 | .75 |
| 2-mercaptobenzothiazole | .8 | 0 |
| Mercaptoalkylthiazoles | 0 | .8 |

When these compositions were vulcanized and tested for hysteresis and permanent set, the following results were obtained:

| Composition | $\Delta T$ (°F.) room temp. | Permanent set (%) room temp. | $\Delta T$ (°F.) 212° F. | Permanent set (%) 212° F. |
|---|---|---|---|---|
| A | 88 | 8.8 | 113 | 37.5 |
| B | 70 | 4.5 | 44 | 16.9 |

The superiority of the composition vulcanized in the presence of the alkyl thiazyl accelerator, particularly at high temperatures, is obvious.

In another embodiment of the invention, di-4,5-dimethylthiazyl disulfide was substituted for a mixture of 2-mercaptobenzothiazole and polybutylidene aniline in a heavily-loaded tire tread composition with outstanding results. The following compositions were prepared:

|  | A | B |
|---|---|---|
| Rubber | 100 | 100 |
| Channel black | 61 | 61 |
| Zinc oxide | 3.5 | 3.5 |
| Softener | 3.0 | 3.0 |
| Fatty acid | 3.0 | 3.0 |
| Antioxidant | 1.0 | 1.0 |
| Sulfur | 3.0 | 3.0 |
| 2-mercaptobenzothiazole | .44 | 0 |
| Polybutylidine aniline | .22 | 0 |
| Di-4,5-dimethylthiazyl disulfide | 0 | 1.0 |

When the compositions were vulcanized and tested for hysteresis and permanent set, the following results were obtained:

| Composition | $\Delta T$ (°F.) room temp. | Permanent set (%) room temp. | $\Delta T$ (°F.) 212° F. | Permanent set (%) 212° F. |
|---|---|---|---|---|
| A | 107 | 14.4 | 83 | 28.1 |
| B | 99 | 10 | 48 | 14.0 |

It will be noted that in the examples given, very high loadings of pigments have been employed. It is not necessary to employ such extreme loadings to realize the advantages of this invention. The substitution of the mercapto aliphatic thiazyl accelerator may be made at any time when the pigment loading becomes heavy enough to affect adversely the hysteresis. Though this point will naturally vary for different pigments of different particle shape and size, it may be said in general that the method of this invention becomes useful from pigment loadings above 20 parts of pigment per 100 parts of rubber. It may be desirable in exceptional cases, to employ the mercapto aliphatic thiazoles at even lower loadings for the reasons heretofore set out.

Although the use of the mercapto aliphatic thiazoles has been described in detail in connection with specific rubber compositions, it will be evident that this invention is applicable to rubber compositions of the most varied nature, and that all manner of rubber goods including pneumatic and solid rubber tires, tubes, hose, belting, packing, boots and shoes, surgical rubber goods, seamless dipped rubber articles, etc. may be vulcanized in the manner herein described.

It is to be understood that the term "a rubber" is employed in the appended claims in a generic sense to designate rubbery materials capable of vulcanization when heated with sulfur and includes caoutchouc, balata, gutta percha, latex, rubber isomers and synthetic rubber.

While I have herein described specific embodiments of my invention, I do not intend to limit the invention solely thereto, for it will be obvious to those skilled in the art that many modifications are within the spirit and scope of the invention as defined in the appended claims.

I claim:

1. The process which comprises vulcanizing a rubber containing at least about half as much channel black as rubber in the presence of 2-mercapto-4,5-dimethyl thiazole.

2. The process which comprises vulcanizing a rubber containing at least about half as much channel black as rubber in the presence of di-4,5-dimethylthiazyl disulfide.

3. A rubber composition comprising a rubber containing at least about half as much channel black as rubber, which composition has been vulcanized in the presence of 2-mercapto-4,5-dimethyl thiazole.

4. A rubber composition comprising a rubber containing at least about half as much channel black as rubber which composition has been vulcanized in the presence of di-4,5-dimethylthiazyl disulfide.

5. The process which comprises vulcanizing a rubber containing at least about half as much channel black as rubber in the presence of a member of the class consisting of 2-mercapto-4,5-dimethyl thiazole and di-4,5-dimethylthiazyl disulfide.

6. A rubber composition containing at least about half as much channel black as rubber, which composition has been vulcanized in the presence of a member of the class consisting of 2-mercapto-4,5-dimethyl thiazole and di-4,5-dimethylthiazyl disulfide.

WARREN E. PHILLIPS.